US008224688B2

(12) United States Patent
Ayres de Castro et al.

(10) Patent No.: US 8,224,688 B2
(45) Date of Patent: Jul. 17, 2012

(54) SYSTEM AND METHOD FOR DISAGGREGATING WEEKLY FORECAST INTO DAILY COMPONENTS (75) Inventors: Gustavo Ayres de Castro, Scottsdale, AZ (US); Mohammed Mneimneh, Scottsdale, AZ (US)

(73) Assignee: SAP AG, Walldorf (DE)

( * ) Notice: Subject to any disclaimer, the term of this patent is extended or adjusted under 35 U.S.C. 154(b) by 398 days.

(21) Appl. No.: 12/566,543

(22) Filed: Sep. 24, 2009

(65) Prior Publication Data

US 2011/0071885 A1 Mar. 24, 2011

(51) Int. Cl.
*G06Q 10/00* (2012.01)
*G06Q 30/00* (2012.01)
(52) U.S. Cl. .................................... 705/7.31
(58) Field of Classification Search .................... 705/7.31
See application file for complete search history.

(56) References Cited

U.S. PATENT DOCUMENTS

| | | | | |
|---|---|---|---|---|
| 5,185,780 A * | 2/1993 | Leggett | 379/265.08 |
| 5,953,707 A * | 9/1999 | Huang et al. | 705/7.25 |
| 6,611,726 B1 * | 8/2003 | Crosswhite | 700/99 |
| 7,062,447 B1 * | 6/2006 | Valentine et al. | 705/1.1 |
| 7,222,786 B2 * | 5/2007 | Renz et al. | 235/385 |
| 7,398,232 B2 * | 7/2008 | Renz et al. | 705/28 |
| 7,480,623 B1 * | 1/2009 | Landvater | 705/7.25 |
| 7,533,037 B1 * | 5/2009 | Noble et al. | 705/7.31 |
| 7,552,066 B1 * | 6/2009 | Landvater | 705/7.25 |
| 7,644,863 B2 * | 1/2010 | Chen et al. | 235/385 |
| 7,899,691 B1 * | 3/2011 | Lee et al. | 705/5 |
| 7,987,106 B1 * | 7/2011 | Aykin | 705/7.11 |
| 2002/0107720 A1 * | 8/2002 | Martin | 705/10 |
| 2004/0098296 A1 * | 5/2004 | Bamberg et al. | 705/10 |
| 2005/0288989 A1 * | 12/2005 | Kim et al. | 705/10 |
| 2006/0085246 A1 * | 4/2006 | Li | 705/10 |
| 2008/0162270 A1 * | 7/2008 | Kim et al. | 705/10 |
| 2009/0125385 A1 * | 5/2009 | Landvater | 705/10 |
| 2010/0010870 A1 * | 1/2010 | Millar et al. | 705/10 |
| 2010/0138274 A1 * | 6/2010 | Bateni et al. | 705/10 |
| 2011/0264485 A1 * | 10/2011 | Notani et al. | 705/7.31 |

OTHER PUBLICATIONS

Responsive Demand Planning, SAP, SAP Library (Help)—Retrieved Dec. 20, 2011.*
Desai, Sunil, Demand Forecast Accuracy Depends on Placing Pacing, SupplyChainBrain.com, 2008, Retreieved Dec. 20, 2011.*
APO Interview Internal Training—Demand Planning Overview, Accenture SAPSCM/APO European Initiative, Mar. 2003.*
Godfrey, Gregory A. et al., Adaptive Estimation of Daily Demands with Complex Calendar Effects for Freight Trasnportation, Princeton University, May 1999.*
Kilger, Christoph et al., Demand Planing (7), Germany 2006.*

* cited by examiner

*Primary Examiner* — Scott L Jarrett
(74) *Attorney, Agent, or Firm* — Buckley, Maschoff & Talwalker LLC (57) ABSTRACT

A computer-implemented method transforms transactional data into a forecast of demand for controlling a commerce system. Goods move between members of a commerce system. The transactional data is recorded. Daily disaggregating parameters (DDP) are estimated by minimizing an error function of day of week and transactional data grouped according to promotion, price range, or customer. Model parameters are estimated based on the DDP and transactional data using a demand model to generate a weekly forecast of demand for the good. The weekly forecast of demand is disaggregated into daily components using the DDP. The daily components of the forecast of demand are provided to a member of the commerce system to control the movement of goods in the commerce system. Any variation in the demand model due to promotions, price changes, out-of-stock, and low selling product is taken into account when determining the daily components.

21 Claims, 3 Drawing Sheets

SYSTEM AND METHOD FOR DISAGGREGATING WEEKLY FORECAST INTO DAILY COMPONENTS

FIELD OF THE INVENTION

The present invention relates in general to economic modeling and, more particularly, to a system and method for disaggregating weekly forecasts into daily components.

BACKGROUND OF THE INVENTION

Economic and financial modeling and planning is commonly used to estimate or predict the performance and outcome of real systems, given specific sets of input data of interest. An economic-based system will have many variables and influences which determine its behavior. A model is a mathematical expression or representation which predicts the outcome or behavior of the system under a variety of conditions. In one sense, it is relatively easy to review historical data, understand its past performance, and state with relative certainty that the system's past behavior was indeed driven by the historical data. A much more difficult task is to generate a mathematical model of the system which predicts how the system will behave with different sets of data and assumptions.

In its basic form, the economic model can be viewed as a predicted or anticipated outcome of a mathematical expression, as driven by a given set of input data and assumptions. The input data is processed through the mathematical expression representing either the expected or current behavior of the real system. The mathematical expression is formulated or derived from principles of probability and statistics, often by analyzing historical data and corresponding known outcomes, to achieve a best fit of the expected behavior of the system to other sets of data. In other words, the model should be able to predict the outcome or response of the system to a specific set of data being considered or proposed, within a level of confidence, or an acceptable level of uncertainty.

Economic modeling has many uses and applications. One area in which modeling has been applied is in the retail environment. Grocery stores, general merchandise stores, specialty shops, and other retail outlets face stiff competition for limited customers and business. Most if not all retail stores expend great effort to maximize sales, volume, revenue, and/or profit. Economic modeling can be a very effective tool in helping store owners and managers achieve these goals.

Economic modeling typically requires large amounts of data. In the retail environment, the data is collected at the completion of the transaction, usually during the check-out process. The transactional log (T-LOG) data contains information and attributes about the items purchased, time and date of purchase, store, price, promotions, customer attributes, and so on. The T-LOG data is stored in a database for use by the retailer in generating and using the model.

To prepare a model of sales or demand of any particular product of any particular store, the T-LOG data is first aggregated over a time scale for one or more variables to develop a unique understanding of demand for every product in every location. The aggregated T-LOG data is analyzed and a series of parameters is generated that define the demand model for that particular product over the time scale of interest. For products that have a relatively high sales volume, the T-LOG data contains many data points and the demand model for that product is relatively robust. The demand model is leveraged to produce accurate forecasts of future demand—even in the face of anticipated future price and promotional changes. The model can also be leveraged to optimize prices and support other business decisions. Multiple retail applications can be built on top of the demand model forecast in order to share its understanding of demand in a way that ensures consistent business decisions from planning through replenishment.

The store management is typically most interested in model behavior and even becomes dependent on the model when making business decisions. The performance of the model, i.e., time and resources needed to execute the model, is also important to management as they often require timely and accurate forecasts of the demand data. Management is always interested in the current model predictions in small windows of time, based on the latest T-LOG data. Modeling on a weekly basis helps improve the performance of the demand model compared to modeling on a daily basis. Aggregation to the week improves performance but limits the resolution and the utility of the model since the model cannot be directly used to forecast sales for a particular day. For example, the model behavior for product sales on Monday or Tuesday may be different than the model for product sales on Friday or Saturday. People buy more beer and chips on the weekend than during weekdays. Accordingly, management may run the model for each day of the week to get the desired resolution or granularity and be assured of operating with the best information.

The model requires significant computing resources to process potentially terabytes of T-LOG data. The output of the model also requires large data storage capacity. Running the model for each day of the week, for each and every week of the month, is time consuming, resource intensive, and costly.

SUMMARY OF THE INVENTION

A need exists to model demand behavior for short time scales, e.g., daily basis, without executing the model for each time scale of interest. Accordingly, in one embodiment, the present invention is a computer-implemented method for transforming transactional data into a forecast of demand for controlling a commerce system comprising the steps of moving goods between members of a commerce system, and recording transactional data related to movement of goods between the members of the commerce system. The transactional data includes price, product, time, promotion, and customer. The method further includes the steps of estimating DDP by minimizing an error function of day of week and transactional data grouped according to promotion, price range, or customer, estimating model parameters based on the DDP and transactional data using a demand model to generate a weekly forecast of demand for the goods, disaggregating the weekly forecast of demand into daily components using the DDP, and providing the daily components of the weekly forecast of demand for the goods to a member of the commerce system to control the movement of goods in the commerce system.

In another embodiment, the present invention is a computer-implemented method for controlling commercial transactions using a forecast of demand comprising the steps of moving goods between members of a commerce system, recording transactional data related to movement of goods between the members of the commerce system, providing a demand model utilizing the transactional data to generate a forecast of demand for the goods, estimating DDP by minimizing an error function of day of week and transactional data grouped according to promotion, price range, or customer, estimating model parameters based on the DDP and transactional data using a demand model to generate a forecast of demand for the goods based on a first time scale, disaggregating the forecast of demand into components based on a second time scale using the DDP, and providing the components of the forecast of demand for the goods to a member of the commerce system to control the movement of goods in the commerce system.

In another embodiment, the present invention is a computer program product comprising computer readable program code embodied in a computer usable medium. The computer readable program code is adapted to implement a method for controlling commercial transactions using a forecast of demand comprising the steps of moving goods between members of a commerce system, recording transactional data related to movement of goods between the members of the commerce system, estimating DDP by minimizing an error function of day of week and transactional data grouped according to promotion, price range, or customer, estimating model parameters based on the DDP and transactional data using a demand model to generate a forecast of demand for the goods based on a first time scale, disaggregating the forecast of demand into components based on a second time scale using the DDP, and providing the components of the forecast of demand for the goods to a member of the commerce system to control the movement of goods in the commerce system.

In another embodiment, the present invention is a system for controlling commercial transactions using a forecast of demand comprising a commerce system having a plurality of members each having a control system for controlling movement of goods between the members. A database is in electronic communication with the commerce system for recording transactional data related to movement of goods between the members of the commerce system. A computer is in electronic communication with the commerce system for estimating DDP by minimizing an error function of day of week and transactional data grouped according to promotion, price range, or customer, estimating model parameters based on the DDP and transactional data using a demand model to generate a forecast of demand for the goods based on a first time scale, and disaggregating the forecast of demand into components based on a second time scale using the DDP. The second time scale is a portion of the first time scale. The components of the forecast of demand for the goods are provided to a member of the commerce system to control the movement of goods in the commerce system.

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Economic and financial modeling and planning is an important business tool that allows companies to conduct business planning, forecast demand, and optimize prices and promotions to meet profit and/or revenue goals. Economic modeling is applicable to many businesses such as manufacturing, distribution, wholesale, retail, medicine, chemicals, financial markets, investing, exchange rates, inflation rates, pricing of options, value of risk, research and development, and the like. In the face of mounting competition and high expectations from investors, most if not all businesses must look for every advantage they can muster in maximizing market share and profits. The ability to forecast demand, in view of pricing and promotional alternatives, and to consider other factors which materially affect overall revenue and profitability is vital to the success of the bottom line, and the fundamental need to not only survive but to prosper and grow.

In particular, economic modeling is essential to businesses that face thin profit margins, such as general customer merchandise and other retail outlets. Many businesses are interested in economic modeling and forecasting, particularly when the model provides a high degree of accuracy or confidence. Such information is a powerful tool and highly valuable to the business.

Using the present system, a retailer collects T-LOG sales data for various products. Using the T-LOG data, the system generates a demand model for one or more products at one or more stores. The model is based upon the T-LOG data for that product and includes a plurality of parameters. The values of the parameters define the demand model and may be used for making predictions about the future sales activity for that product. For example, the model for each product can be used to predict future demand or sales of the product at that store in response to a proposed price, associated promotions or advertising, as well as impacts from holidays and local seasonal variations. Promotion and advertising increase customer awareness of the product.

An economic demand model analyzes historical retail T-LOG sales data to gain an understanding of retail demand as a function of retailer controlled factors such as price, promotion, time, customer, seasonal trends, holidays, and other attributes of the transaction. The demand model can be used to forecast future demand by customers as measured by unit sales. Unit sales are typically inversely related to price, i.e., the lower the price, the higher the sales. The quality of the demand model—and therefore the forecast quality—is directly affected by the quantity, composition, and accuracy of historical T-LOG sales data provided to the model.

The retailer makes business decisions based on forecasts. The retailer orders stock for replenishment purposes and select items for promotion or price discount. To support good decisions, it is important to quantify the quality of each forecast. The retailer can then review any actions to be taken based on the accuracy of the forecasts on a case-by-case basis.

Figure 1:
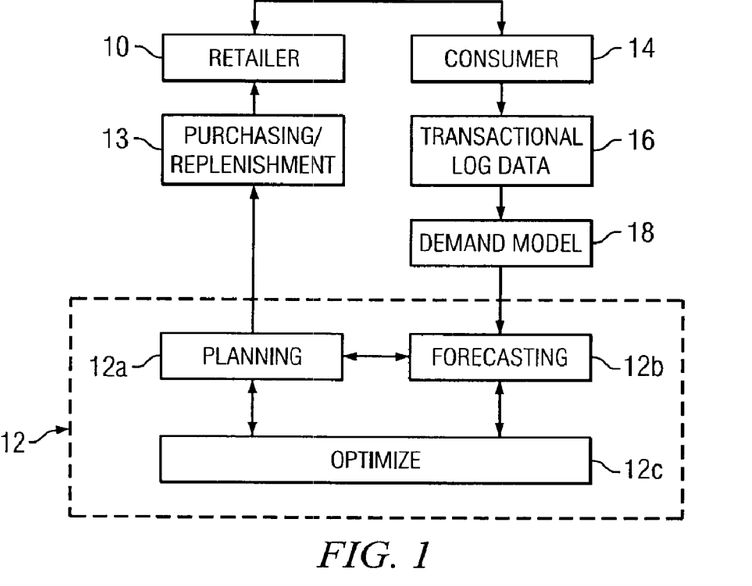
FIG. 1 is a block diagram of a system for analyzing transactional log data to generate a demand model and executing a business plan in accordance with the demand model.

Referring to FIG. 1, retailer 10 has certain product lines or services available to customers as part of its business plan 12. The terms product and service are interchangeable in the present commercial system. Retailer 10 may be a food store chain, general customer product retailer, drug store, discount warehouse, department store, specialty store, or service provider. Retailer 10 has the ability to set pricing, order inventory, run promotions, arrange its product displays, collect and maintain historical sales data, and adjust its strategic business plan. While the present discussion will center around retailer 10, it is understood that the system described herein is applicable to data analysis for other members in the chain of retail commerce, or other industries and businesses having similar goals, constraints, and needs.

Business plan 12 includes planning 12a, forecasting 12b, and optimization 12c steps and operations. Business plan 12 gives retailer 10 the ability to evaluate performance and trends, make strategic decisions, set pricing, order inventory, formulate and run promotions, hire employees, expand stores, add and remove product lines, organize product shelving and displays, select signage, and the like. Business plan 12 allows retailer 10 to analyze data, evaluate alternatives, run forecasts, and make decisions to control its operations. With input from the planning 12a, forecasting 12b, and optimization 12c steps and operations of business plan 12, retailer 10 undertakes various purchasing or replenishment operations 13. Retailer 10 can change business plan 12 as needed.

Retailer 10 routinely enters into sales transactions with customers 14. In fact, retailer 10 maintains and updates its business plan 12 to increase the number of transactions (and thus revenue and/or profit) between retailer 10 and customer 14. Customer 14 can be a specific individual, account, or business entity.

For each sales transaction entered into between retailer 10 and customer 14, information describing the transaction is stored in T-LOG 16. When a customer goes through the check-out at a grocery or any other retail store, each of the items to be purchased is scanned and data is collected and stored by a point-of-sale (POS) system, or other suitable data storage system, in T-LOG 16. The data includes the then current price, promotion, and merchandizing information associated with the product along with the units purchased, and the dollar sales. The date and time, and store and customer information corresponding to that purchase are also recorded.

T-LOG 16 contains one or more line items for each retail transaction, such as those shown in Table 1. Each line item includes information or attributes relating to the transaction such as store number, product number, time of transaction, transaction number, quantity, current price, profit, promotion number, and customer or customer category or type number. The store number identifies a specific store; product number identifies a product; time of transaction includes date and time of day; quantity is the number of units of the product; current price (in US dollars) can be the regular price, reduced price, or higher price in some circumstances; profit is the difference between current price and cost of selling the item; promotion number identifies any promotion associated with the product, e.g., flyer, ad, sale price, coupon, rebate, end-cap, etc; customer identifies the customer by type, class, region, or individual, e.g., discount card holder, government sponsored or under-privileged, volume purchaser, corporate entity, preferred customer, or special member. T-LOG 16 is accurate, observable, and granular product information based on actual retail transactions within the store. T-LOG 16 represents the known and observable results from the customer buying decision or process. T-LOG 16 may contain thousands of transactions for retailer 10 per store per day, or millions of transactions per chain of stores per day.

TABLE 1

T-LOG Data

| STORE | PRODUCT | TIME | TRANS | QTY | PRICE | PROFIT | PROMOTION | CUSTOMER |
|---|---|---|---|---|---|---|---|---|
| S1 | P1 | D1 | T1 | 1 | 1.50 | 0.20 | PROMO1 | C1 |
| S1 | P2 | D1 | T1 | 2 | 0.80 | 0.05 | PROMO2 | C1 |
| S1 | P3 | D1 | T1 | 3 | 3.00 | 0.40 | PROMO3 | C1 |
| S1 | P4 | D1 | T2 | 4 | 1.80 | 0.50 | 0 | C2 |
| S1 | P5 | D1 | T2 | 1 | 2.25 | 0.60 | 0 | C2 |
| S1 | P6 | D1 | T3 | 10 | 2.65 | 0.55 | PROMO4 | C3 |
| S1 | P1 | D2 | T1 | 5 | 1.50 | 0.20 | PROMO1 | C4 |
| S2 | P7 | D3 | T1 | 1 | 5.00 | 1.10 | PROMO5 | C5 |
| S2 | P1 | D3 | T2 | 2 | 1.50 | 0.20 | PROMO1 | C6 |
| S2 | P8 | D3 | T2 | 1 | 3.30 | 0.65 | 0 | C6 |

The first line item shows that on day/time D1, store S1 had transaction T1 in which customer C1 purchased one product P1 at $1.50. The next two line items also refer to transaction T1 and day/time D1, in which customer C1 also purchased two products P2 at $0.80 each and three products P3 at price $3.00 each. In transaction T2 on day/time D1, customer C2 has four products P4 at price $1.80 each and one product P5 at price $2.25. In transaction T3 on day/time D1, customer C3 has ten products P6 at $2.65 each, in his or her basket. In transaction T1 on day/time D2 (different day and time) in store S1, customer C4 purchased five products P1 at price $1.50 each. In store S2, transaction T1 with customer C5 on day/time D3 (different day and time) involved one product P7 at price $5.00. In store S2, transaction T2 with customer C6 on day/time D3 involved two products P1 at price $1.50 each and one product P8 at price $3.30.

Table 1 further shows that product P1 in transaction T1 had promotion PROMO1. PROMO1 may be any suitable product promotion such as a front-page featured item in a local advertising flyer. Product P2 in transaction T1 had promotion PROMO2 as an end-cap display in store S1. Product P3 in transaction T1 had promotion PROMO3 as a reduced sale price. Product P4 in transaction T2 on day/time D1 had no promotional offering. Likewise, product P5 in transaction T2 had no promotional offering. Product P6 in transaction T3 on day/time D1 had promotion PROMO4 as a volume discount for 10 or more items. Product P7 in transaction T1 on day/time D3 had promotion PROMO5 as a $0.50 rebate. Product P8 in transaction T2 had no promotional offering. A promotion may also be classified as a combination of promotions, e.g., flyer with sale price or end-cap with rebate.

Retailer 10 may also provide additional information to T-LOG 16 such as promotional calendar and events, holidays, seasonality, store set-up, shelf location, end-cap displays, flyers, and advertisements. The information associated with a flyer distribution, e.g., publication medium, run dates, distribution, product location within flyer, and advertised prices, is stored within T-LOG 16.

With T-LOG 16 data collected, any suitable method or algorithm may be used to analyze the data and form demand model 18. Model 18 may use a combination of linear, non-linear, deterministic, stochastic, static, or dynamic equations or models for analyzing T-LOG 16 or aggregated T-LOG 16 data and making predictions about customer behavior to future transactions for a particular product at a particular store, or across entire product lines for all stores. Model 18 is defined by a plurality of parameters and may be used to generate unit sales forecasting, price optimization, promotion optimization, markdown/clearance optimization, assortment optimization, merchandize and assortment planning, seasonal and holiday variance, and replenishment optimization. Model 18 has a suitable output and reporting system that enables the output from model 18 to be retrieved and analyzed for updating business plan 12.

After collection and analysis of the T-LOG data, several demand models can be generated for one or more products sold by retailer 10 at one or more stores. The models are defined by several parameters that provide weighting for different elements of the model. For example, the parameters control how the model reflects changes in product advertising, pricing, promotional activities, or other aspects of the market environment for the product.

Figure 2:
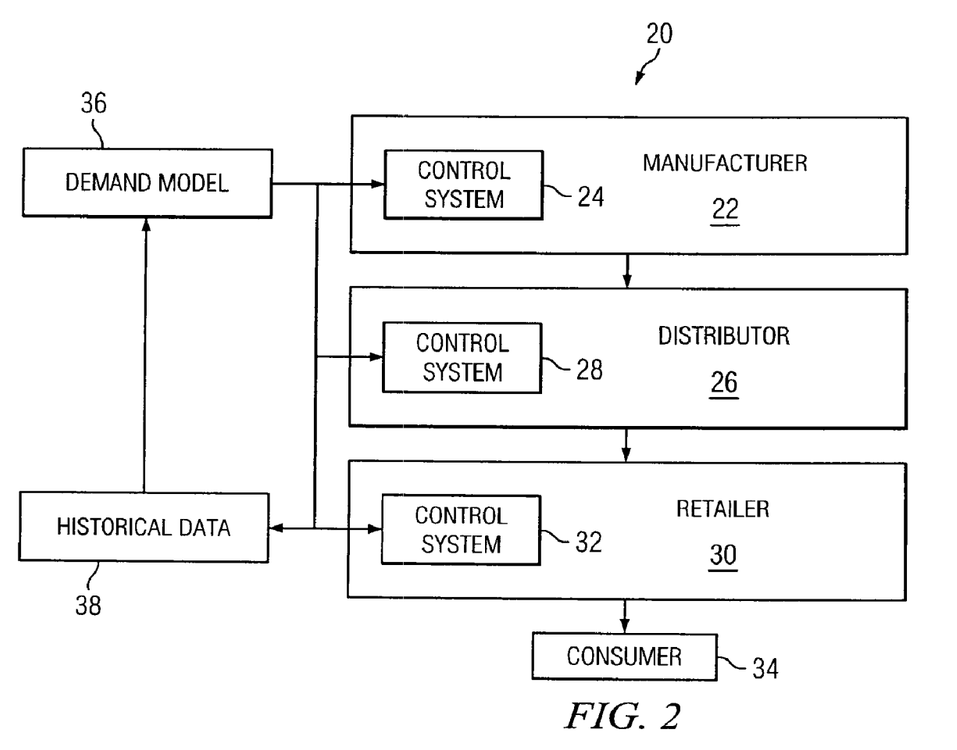
FIG. 2 is a block diagram of a commerce system controlled by members utilizing the daily components of the weekly forecast of demand.

In FIG. 2, a commerce system 20 is shown involving the movement of goods between members of the system. Manufacturer 22 produces goods in commerce system 20. Manufacturer 22 uses control system 24 to receive orders, control manufacturing and inventory, and schedule deliveries. Distributor 26 receives goods from manufacturer 22 for distribution within commerce system 20. Distributor 26 uses control system 28 to receive orders, control inventory, and schedule deliveries. Retailer 30 receives goods from distributor 26 for sale within commerce system 20. Retailer 30 uses control system 32 to place orders, control inventory, and schedule deliveries with distributor 26. Retailer 30 sells goods to customer 34.

Manufacturer 22, distributor 26, and retailer 30 utilize demand model 36 (equivalent to model 18), via respective control systems 24, 28, and 32, to control and optimize the ordering, manufacturing, distribution, sale of the goods, and otherwise execute respective business plan 12 within commerce system 20. Manufacturer 22, distributor 26, and retailer 30 provide historical transactional data 38 to demand model 36 by electronic communication link, which in turn generates forecasts to predict the need for goods by each member and control its operations. In one embodiment, each member provides its own historical transactional data 38 to demand model 36 to generate a forecast of demand specific to its business plan 12. Alternatively, all members can provide historical transactional data 38 to demand model 36 to generate composite forecasts relevant to the overall flow of goods. For example, manufacturer 22 may consider a proposed price, rebate, promotion, seasonality, or other attribute for one or more goods that it produces. Demand model 36 generates the forecast of sales based on the proposed price, customer, rebate, promotion, time, seasonality, or other attribute of the goods. The forecast is communicated to control system 24 by electronic communication link, which in turn controls the manufacturing process and delivery schedule of manufacturer 22 to send goods to distributor 26 based on the predicted demand. Likewise, distributor 26 or retailer 30 may consider a proposed price, rebate, promotion, or other attributes for one or more goods that it sells. Demand model 36 generates the forecast of demand based on the proposed price, customer, rebate, promotion, time, seasonality, and/or other attribute of the goods. The forecast is communicated to control system 28 or control system 32 by electronic communication link, which in turn controls ordering, distribution, inventory, and delivery schedule for distributor 26 and retail 30 to meet the predicted demand for goods in accordance with the forecast.

Figure 3:
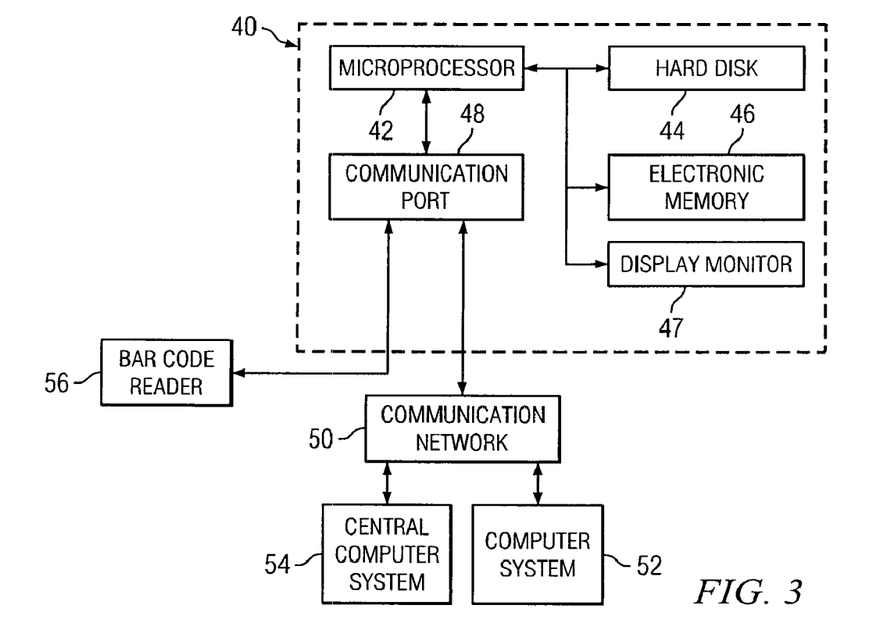
FIG. 3 is a computer system for executing the demand model and controlling the commerce system using daily components of the weekly forecast of demand.

A general purpose computer 40 is shown in FIG. 3. Computer 40 includes central processing unit or microprocessor 42, mass storage device or hard disk 44, electronic memory 46, display monitor 47, and communication port 48. Communication port 48 is a high-speed communication link through communication network 50 to computer system 52 and central computer system 54, which includes a database storage system. In one embodiment, computer 40 provides execution for control system 32, computer system 52 provides execution for each of control systems 24 and 28, and central computer system 54 provides execution for demand model 36 from historical transactional data 38. Demand model 36 can also be executed on each of control systems 24, 28, and 32.

Computer 40 runs application software for executing software instructions that generate forecasts through demand model 36 and control commerce system 20. The software is originally provided on computer readable media, such as compact disks (CDs), or downloaded from a vendor website, and installed on the desired computer.

In the case of retailer 30, each product includes a universal product code (UPC) or barcode label. The barcode is encoded with a unique identification number for the product. The product is scanned over barcode reader 56 at the store checkout counter to read the UPC identification number. Barcode reader 56 is connected to communication port 48 to transfer the UPC data to computer 40. Computer 40 may be part of a computer network which connects multiple barcode readers in many stores to a central computer system which stores historical transactional data 38 in the database storage system.

From the UPC data, a product database on hard disk 44 retrieves the price for the product and any promotional initiatives. As each product from the customer's basket is scanned, computer 40 builds up a transaction in temporary file space on hard disk 44. Once the transaction is complete and customer 34 has paid, the transaction becomes a permanent T-LOG record in historical transactional data 38 in central computer system 54. The historical T-LOG data is used to generate a demand model 36 which in turn is used to generate the forecast of demand. The forecast is used by respective control systems in manufacturer 22, distributor 26, and retailer 30 to control commerce system 20. Display monitor 47 displays the forecast for the user.

In one specific example, retailer 30 generates a forecast using demand model 36 based on historical transactional data 38, to predict demand associated with a proposed attribute of the transaction, e.g., a new and lower price for a particular product. Retailer 30 receives the forecast and executes or modifies its business plan 12 to act according to the prediction. If retailer 30 makes the business decision based on the forecast to proceed with the price reduction, control system 32 communicates with control systems 24 and 28 to coordinate manufacture and distribution of the product necessary to meet the projected demand by customer 34 in view of the price decrease. Manufacturer 22 increases its production of the product and distributor prepares to meet the orders from retailer 30. Demand model 36 is thus used in the control of commerce system 20.

Demand model 36 generates a forecast based on historical transactional data and causal factors. The T-LOG data is transformed into a probability distribution of the forecast with parameters of price, promotion, seasonality, customer, and time. Demand model 36 processes large amounts (e.g., terabytes) of POS T-LOG data to develop a prediction of demand for each product in each location. Demand model 36 can be leveraged to produce accurate forecasts of future demand—even in the face of anticipated future price and promotional changes. Model 36 can also be leveraged to optimize prices and support other business decisions. Multiple retail applications can be built on top of demand model forecast in order to share its understanding of demand in a way that ensures consistent business decisions from planning through replenishment.

Demand model 36 determines daily disaggregating parameters (DDPs) which are used to disaggregate weekly forecasts into daily components. The contribution of each day of the week to the weekly value of a performance indicator is estimated from the daily sales via a stable estimation procedure. The procedure makes use of incomplete week data without biasing the model. The modeling process is more precise than industry standard estimates, and is robust to low data content and to large swings in demand due to price, promotion, or other known factor.

The performance of demand model 36 is of great importance to manufacturer 22, distributor 26, and retailer 30 in commerce system 20, as each needs timely and accurate forecasts of the demand data. Running demand model 36 on a daily time scale consumes significant computing resources and requires extensive data storage capacity. Conversely, running demand model 36 on a weekly time scale uses fewer resources, fewer modeling parameters, and hence improves performance and parsimony of the model, but aggregation to the week limits resolution and utility as the model cannot model or forecast sales for a particular day. For example, resolution on a weekly basis does not allow the model to observe higher sales of a product, e.g., party supplies, more commonly purchased on weekends rather than on weekdays.

To overcome this limitation, demand model 36 estimates DDPs to decompose forecasts for a time scale (weekly) into components or portions of the time scale (daily). The following discussion assumes weekly forecast disaggregated into daily components. However, it is understood that the disaggregating parameters can also be determined for other time scales, e.g., monthly forecasts into weekly components, or yearly forecasts into monthly components, depending on the demands of commerce system 20.

In one embodiment, demand model 36 uses a least squares estimation of the DDPs. In the least squares approach, the function Txn(k,d,t) represents the transactions for price promotion k on day d for week t. The value of d can be 1, 2, 3, 4, 5, 6, or 7. The value of t is a unique week in time. The normalized transactions by day is given in equation (1).

$$Txn(k, t) = \sum_{d=1}^{7} Txn(k, d, t) \qquad (1)$$

$$w_{act}(k, d, t) = \frac{Txn(k, d, t)}{Txn(k, t)}$$

where: k is the index for a "bin" or group based on price
d is an index for the day in the week (values in {1, 2, . . . , 7})
t is an index for weeks The data records in $w_{act}(k,d,t)$ that have zero value due to unavailability, e.g., no offerings for that category of sales on that day, are removed to avoid biasing the weight calculation. Zero records that are due to zero sales when the product was available are kept. The daily error on the day weight is given in equation (2).

$$\text{error}(k, d, t) = Txn(k, t)\left(w(d) - w_{act}(k, d, t)\left(\sum_{d \in I(k,t)} w(d)\right)\right) \qquad (2)$$

where: w(d) is the weight for $d_{th}$ day of week k
I(k,t) represents the days of the week (values of d) for which $w_{act}(k,d,t_0)$ has non-zero values For example, if for week t=12, product P had sales on Sunday (d=1), then product P was out-of-stock (OS) from Monday (d=2) through Thursday (d=5), and product P had sales for Friday (d=6) and Saturday (d=7), then I(k,t)={1, 6, 7}, and the daily error is given in equation (3).

$$\text{error}(k, d, t) = Txn(k, t)\left(w(d) - w_{act}(k, d, 12)\left(\sum_{d \in I(k,12)} w(d)\right)\right) \qquad (3)$$

The error(k,d,12) is defined only for d∈I(12)={1, 6, 7}, since product P was unavailable in other weeks.

The DDPs can be determined by minimizing a metric of the error function, for example the variance given in equation (4).

$$\min \sum_{\substack{t \in All\ Times \\ d \in \{1, \ldots, 7\} \\ k \in All\ Times}} (\text{error}(k, d, t))^2 \qquad (4)$$

subject to the constraints:

$$\sum_{d=1}^{7} w(d) = 1,$$

and $$w(d) \geq 0, \text{ for } d=1, \ldots, 7.$$

The price promotion index k is implied in equations (5)-(8), i.e., all the summations below do not sum over k. The variables $w_d$, d=1, . . . , 7, are determined by summing the squares of the daily error over all weeks. In other words, $w_d$, d=1, . . . , 7 is determined in order to solve equation (5).

$$\min \sum_{t=1}^{N} (\text{error}_{week}(t))^2 = \qquad (5)$$

$$\min\left\{\sum_{t=1}^{N} Txn^2(t) \sum_{d \in I(t)} \left(w(d) - w_{act}(d, t)\left(\sum_{d \in I(t)} w_{act}(d)\right)\right)^2\right\}$$

subject to the constraints:

$$\sum_{d=1}^{7} w(d) = 1,$$

and $$w(d) \geq 0, \text{ for } d=1, \ldots, 7.$$

To further improve the method, prior knowledge of the DDPs can be incorporated into the objective function. In the absence of data, the DDPs should equal pre-defined weights $q_1, \ldots, q_7$, which can be incorporated in the optimization by adding a weighted norm to the objective function in equation (6).

$$\min \sum_{\substack{t \in All\ Times \\ d \in \{1,\ldots,7\} \\ k \in All}} (\text{error}(k, d, t))^2 + \sum_{d=1}^{7} \kappa_d (w(d) - q)^2 \quad (6)$$

subject to the constraints:

$$\sum_{k=1}^{7} w(d) = 1,$$

and $$w(d) \geq 0, \text{ for } d=1, \ldots, 7.$$

The constant κ can be interpreted as the confidence in the prior for w. In deciding the value for the constant κ, the constant κ should be compared to the scale of the expected variance of the errors. A scaling is provided for each error observation based on the number of unit sales for that day. Equation (6) is resolved using standard constrained least squares techniques.

Demand model 36 utilizes less processing time and resources in disaggregating weekly models and/or forecasts into daily components than the incremental cost of modeling a daily aggregated POS T-LOG data. Model 36 must also be robust to effects that would distort simple averaging. These distorting effects include partial week out-of-stock events, partial week promotions and the sparse data that may exist for low selling products. Demand model 36 is parsimonious as in order to create a model with daily time scale it only uses seven more parameters than the weekly time scale model.

The process of disaggregating weekly model and/or forecast into daily components improves performance by allowing the model to process weekly aggregated T-LOG data, which reduces the dimension and complexity of the mathematical computation required to estimate the demand model. The dimension reduction is achieved by factoring the problem of fitting one large model with several interrelated variables into separate smaller models with fewer variables. The daily disaggregating parameter estimation is processed in a separate step from the estimation of the other parameters, such as seasonality, price lift, promotion lift, and cannibalization. The parameters are fairly stable and need not be estimated every modeling cycle.

Assume that retail data is initially aggregated for each unique combination of product, store, day, price, promotion, and customer. A unique set of DDPs is estimated for each product location combination. However, some simple known methods of estimating daily components from weekly forecasts, such as averaging of all sales record on a certain day, are prone to error. One issue with simple, known estimation techniques is that promotions and price changes cause reactions in the demand for products that are independent of the normal intra-week variation. The daily components are estimated prior to modeling the response to price and promotion. The input to the estimation for these effects cannot be normalized and distorts the estimates, as shown by example in Table 2. The measured mean indicates the percentage of weekly sales that occurred for each day.

TABLE 2

| Unit sales for Product over 4 weeks with subsequent computation of DDPs. | | | | | | | |
|---|---|---|---|---|---|---|---|
| Units | Sunday | Monday | Tuesday | Wednesday | Thursday | Friday | Saturday |
| week 1 | 10 | 10 | 10 | 10 | 10 | 10 | 10 |
| week 2 | 10 | 10 | 10 | 10 | 10 | 10 | 10 |
| week 3 | 10 | 10 | 10 | 70 | 10 | 10 | 10 |
| week 4 | 10 | 10 | 10 | 10 | 10 | 10 | 10 |
| mean | 11.8% | 11.8% | 11.8% | 29.4% | 11.8% | 11.8% | 11.8% |

Table 2 shows that product normally sells 10 units each day of the week. A promotion with a significant price reduction occurred on Wednesday of week 3 which causes the Wednesday mean as percentage of weekly sales to be too high and the other daily means as percentage of weekly sales to be too low, based on the simple, known estimation of daily components.

In a similar manner, a large regular price change can also distort sales. The simple, known estimation methods tend to ignore these effects and simply compute an average over time, biasing high the days of the week that have had more promotions or lower prices, and low other days.

A second issue encountered by the simple/naïve method for estimating daily components is that products occasionally sell out, are out-of-stock, or simply when a given category (as defined below) is offered in only part of a week. Given that the days when the product was out-of-stock are known, the question is how to determine the daily components. For example, table 3 shows that product A is out-of-stock (OS) on Wednesday of weeks 1 and 3. The measured mean indicates the percentage of weekly sales that occurred for each day.

TABLE 3

Out-of-stock for Product

| Units | Sunday | Monday | Tuesday | Wednesday | Thursday | Friday | Saturday |
|---|---|---|---|---|---|---|---|
| week 1 | 10 | 10 | 10 | 0 (OS) | 10 | 10 | 10 |
| week 2 | 10 | 10 | 10 | 10 | 10 | 10 | 10 |
| week 3 | 10 | 10 | 10 | 0 (OS) | 10 | 10 | 10 |
| week 4 | 10 | 10 | 10 | 10 | 10 | 10 | 10 |
| mean | 15.4% | 15.4% | 15.4% | 7.7% | 15.4% | 15.4% | 15.4% |

Again, the simple, known estimation method is biased due to the zero sales when no stock is available, even though sales would have occurred if stock was available. The mean as percentage of weekly sales for Wednesday is too low and the mean as percentage of weekly sales for the other days is too high, based on simple/naïve estimation of daily components.

Demand model 36 addresses the above limitations by separating the data by category (regular price transactions and promotional transactions). A (transaction) category is defined as a combination of attributes for the transaction such as type of offer (regular sales, promotional sales, etc), customer type, price range, etc. For example one category could be transactions that had regular sales price, purchased by a loyalty customer with regular price between $4.00 and $5.00. For any given category, days that are missing transactions due to out-of-stock or non offering of that category will be discarded from the observation. The percent contribution is determined as the value of sales transactions for that product, store, day, and category, divided by the total sales transactions for that product, store, week, and category. The percent of transactions for each day is determined by dividing the number of transactions for that day by the total for the week, as given in equation (1). The denominator of equation (1) is the sum of all transactions in the week. The data is separated in groups or "bins" for which the data has the same promotion, price range, and customer type. The transactions percentages are deceivingly high and "unbalanced". The appropriate definition of the error metrics allows the solution in presence of unbalanced percentages mentioned above. The observed percentages are weighted with the sum of the modeled percentages for the days that do not contain an "X", as given in the error matrix of equation (2).

Each "bin" information is used to determine the relationship between the days that are present in that bin, so the ratio among percentages carries the relevant information.

A third issue encountered by simple, known methods for estimating daily components involves low selling products. The well-known adage that "80% of the sales come from 20% of the products" is often true in retail. In other words, 80% of products contribute to a low number of sales, as shown in table 4.

TABLE 4

Low Selling Products

| Units | Sunday | Monday | Tuesday | Wednesday | Thursday | Friday | Saturday |
|---|---|---|---|---|---|---|---|
| week 1 | 0 | 0 | 0 | 0 | 1 | 0 | 0 |
| week 2 | 0 | 1 | 0 | 0 | 0 | 0 | 0 |
| week 3 | 0 | 0 | 0 | 0 | 0 | 0 | 1 |
| week 4 | 0 | 0 | 0 | 1 | 0 | 0 | 0 |
| mean | 0.0% | 25.0% | 0.0% | 25.0% | 25.0% | 0.0% | 25.0% |

Clearly, the mean as a percentage of weekly sales for Sunday, Tuesday and Friday should not be zero.

Demand model 36 addresses low selling products by using a Bayesian prior for the value of the estimates for the DDPs. The Bayesian prior can be based on the user's knowledge, or on a more concretely obtainable metric such as the DDPs calculated using the overall transactions on the store, which should statistically provide a stable estimate. The prior information is assumed to have a Gaussian distribution and the user may appropriately set the confidence $\kappa$ (inverse of the variance) as the degree of belief in this prior compared to the data. The Bayesian prior can be incorporated into the solution according to equation (7).

$$\min_{\substack{t \in \text{All Times} \\ d \in \{1, \ldots, 7\} \\ k \in \text{All Times}}} \sum (\text{error}(k, d, t))^2 + \sum_{d=1}^{7} \kappa(w(d) - w_{prior}(d))^2 \quad (7)$$

subject to the constraints:

$$\sum_{k=1}^{7} w(d) = 1,$$

and $$w(d) \geq 0, \text{ for } d=1, \ldots, 7.$$

In cases where the data has low information, such as the case of low selling products, the DDPs approach the value of the priors $w_{prior}(d)$.

A fourth issue encountered by the simple, known methods for estimating daily components from weekly forecasts involves performance of the model and efficient use of resources. The amount of data to be processed is large and the processing time may be prohibitive especially giving that the DDP models are only one part of demand model 36. The issue of scalability in processing time may be solved by using recursive implementations. The first time the DDPs are determined typically requires a full run, utilizing the whole data set. As new sales data becomes available, subsequent executions of demand model 36 require only the incremental historical data, and data from the previous execution. The recursive least squares algorithm (RLS) provides a recursive implementation for the subsequent executions of demand model 36.

As an example, Table 5 shows a week with a promotion from Tuesday to Thursday and out-of-stock events on Friday and Saturday. Total sales in week 1 is 350.

TABLE 5

Promotion and OS Products

| Units | Sunday | Monday | Tuesday | Wednesday | Thursday | Friday | Saturday |
|---|---|---|---|---|---|---|---|
| week 1 | 25 | 25 | 100 | 100 | 100 | 0 | 0 |

The simple, known estimation would produce the daily components as Sunday: 7%; Monday: 7%; Tuesday: 29%; Wednesday: 29%; Thursday: 29%; Friday: 0%; Saturday: 0%. In contrast, demand model 36, the data is first separated into 2 categories as shown in Table 6. The sales for week 1 regular is 50; the sales for week 1 promotion is 300.

TABLE 6

Promotion and OS Products using Demand Model

| Units | Sunday | Monday | Tuesday | Wednesday | Thursday | Friday | Saturday |
|---|---|---|---|---|---|---|---|
| week 1 regular | 25 | 25 | X | X | X | OS | OS |
| week 1 promotion | X | X | 100 | 100 | 100 | X | X |

The days marked "X" are days when either promotion or regular sales were not available. The days marked OS indicate out-of-stock, which can be confirmed by inventory data, or other statistical analysis. Table 7 shows the data transformed to percentages.

TABLE 7

Promotion and OS Products with Demand Model

| Units | Sunday | Monday | Tuesday | Wednesday | Thursday | Friday | Saturday |
|---|---|---|---|---|---|---|---|
| week 1 regular | 50% | 50% | X | X | X | X | X |
| week 1 promotion | X | X | 33% | 33% | 33% | X | X |

Assuming a prior value for the DDP of ⅐ for each day, with a confidence of 100, demand model 36 determines the DDPs for each day of the week as Sunday: 14%; Monday: 14%; Tuesday: 14%; Wednesday: 14%; Thursday: 14%; Friday: 14%; Saturday: 14%. The DDPs for the low selling products from Table 4 according to demand model 36 have similar values.

Figure 4:
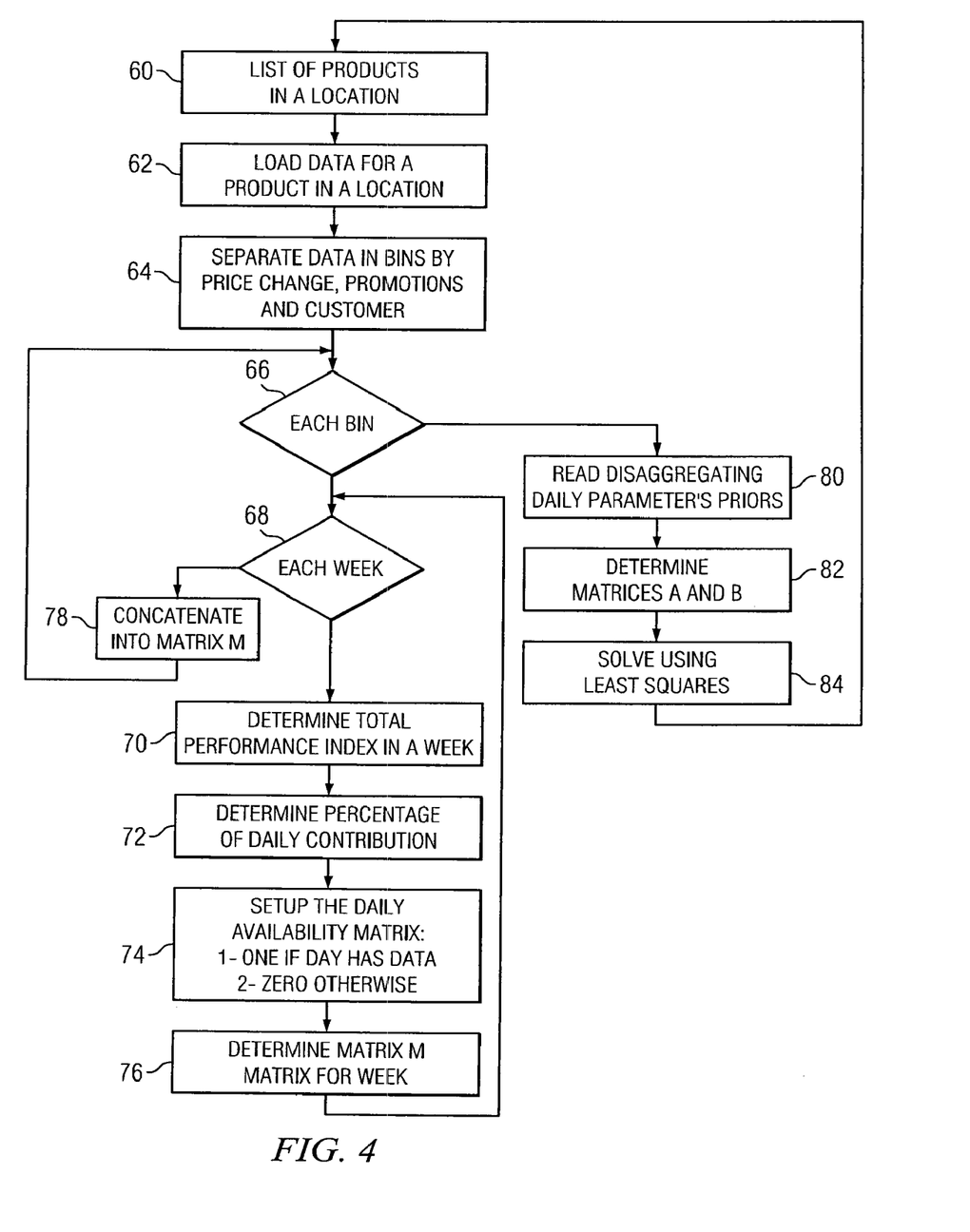
FIG. 4 illustrates a non-recursive implementation of calculating DDPs.

FIG. 4 summarizes the non-recursive implementation of disaggregating weekly forecasts into daily components. In step 60, a list of products for a store location is provided. In step 62, available T-LOG data is loaded for products in a particular location. In step 64, the T-LOG data is separated into bins by price change, promotion, and customer. Step 84 resolves the DDPs using least squares estimation and returns to step 60 to consider the next product in the location.

Figure 5:
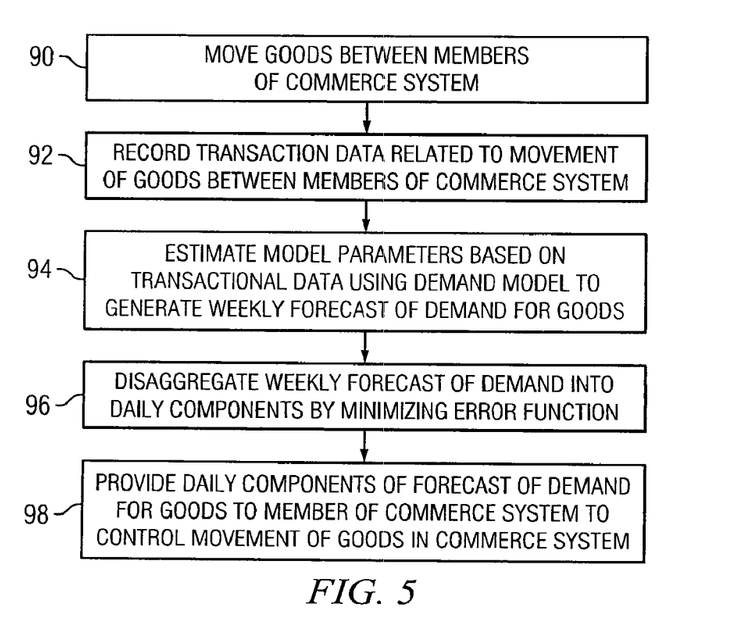
FIG. 5 illustrates a method for disaggregating a weekly forecast of demand into daily components.

FIG. 5 illustrates a process for controlling commercial transactions using a demand model to generate a weekly forecast which is disaggregated into daily components. In step 90, goods move between members of a commerce system. In step 92, transactional data related to movement of goods between the members of the commerce system is recorded. The transactional data includes price, product, time, promotion, and customer. In step 94, DDP are estimated by minimizing an error function of day of week and transactional data grouped according to promotion, price range, or customer. In step 96, model parameters are estimated based on DDP and the transactional data using a demand model to generate a weekly forecast of demand for the goods. In step 98, the weekly forecast of demand is disaggregated into daily components using DDP. Any variation in the demand model due to promotions, price changes, out-of-stock, and low selling products is taken into account when determining the daily components of the weekly forecast of demand. In step 100, the daily components of the weekly forecast of demand for the goods are provided to a member of the commerce system to control the movement of goods in the commerce system. By disaggregating the weekly forecast for demand into daily components of the weekly forecast of demand, fewer computing resources are needed.

While one or more embodiments of the present invention have been illustrated in detail, the skilled artisan will appreciate that modifications and adaptations to those embodiments may be made without departing from the scope of the present invention as set forth in the following claims.

What is claimed is:

1. A computer-implemented method for transforming transactional data into a forecast of demand for controlling a commerce system, comprising:
   recording transactional data related to a movement of goods between members of a commerce system, the transactional data including price, product, time, promotion, and customer;
   estimating, by a processor, daily disaggregating parameters (DDP) by minimizing an error function of day of week and transactional data grouped according to promotion, price range, or customer;
   estimating, by a processor, model parameters based on the DDP and transactional data using a demand model to generate a weekly forecast of demand for the goods;
   disaggregating, by a processor, the weekly forecast of demand into daily components using the DDP;
   determining, by a processor, the daily components of the weekly forecast of demand by minimizing the error function given by:

$$\text{error}(k, d, t) = Txn(k, t)\left(w(d) - w_{act}(k, d, t)\left(\sum_{d \in I(k,t)} w(d)\right)\right);$$

and
   providing the daily components of the weekly forecast of demand for the goods to a member of the commerce system to control the movement of goods in the commerce system.

2. The computer-implemented method of claim 1, wherein the error function is subject to constraints given by:

$$\sum_{d=1}^{7} w(d) = 1, \text{ and } w(d) \geq 0, \text{ for } d = 1, \ldots, 7.$$

3. The computer-implemented method of claim 1, further including accounting, by a processor, for variation in the demand model due to promotions, price changes, and out-of-stock of a product when determining the daily components of the weekly forecast of demand.

4. The computer-implemented method of claim 1, further including accounting, by a processor, for variation in the demand model due to low selling products when determining the daily components of the weekly forecast of demand.

5. The computer-implemented method of claim 1, wherein disaggregating the weekly forecast for demand into daily components of the weekly forecast of demand uses less computing resources than daily aggregation.

6. A computer-implemented method for controlling commercial transactions using a forecast of demand, comprising:
   recording transactional data related to a movement of goods between members of a commerce system;
   estimating, by a processor, daily disaggregating parameters (DDP) by minimizing an error function of day of week and transactional data grouped according to promotion, price range, or customer;
   estimating, by a processor, model parameters based on the DDP and transactional data using a demand model to generate a forecast of demand for the goods based on a first time scale;
   disaggregating, by a processor, the forecast of demand into components based on a second time scale using the DDP;
   determining, by a processor, the components of the forecast of demand by minimizing the error function given by:

$$\text{error}(k, d, t) = Txn(k, t)\left(w(d) - w_{act}(k, d, t)\left(\sum_{d \in I(k,t)} w(d)\right)\right);$$

providing the components of the forecast of demand for the goods to a member of the commerce system to control the movement of goods in the commerce system.

7. The computer-implemented method of claim 6, wherein the first time scale is weekly and the second time scale is daily.

8. The computer-implemented method of claim 6, wherein the error function is subject to constraints given by:

$$\sum_{d=1}^{7} w(d) = 1, \text{ and } w(d) \geq 0, \text{ for } d = 1, \ldots, 7.$$

9. The computer-implemented method of claim 6, further including accounting, by a processor, for variation in the demand model due to promotions, price changes, and out-of-stock of a product when determining the components of the forecast of demand.

10. The computer-implemented method of claim 6, further including accounting, by a processor, for variation in the demand model due to low selling products when determining the components of the forecast of demand.

11. The computer-implemented method of claim 6, wherein disaggregating the forecast for demand into daily components uses less computing resources than daily aggregation.

12. A computer-readable medium having computer readable program code embodied thereon and capable of execution by a computer, the medium comprising:
   program code to record transactional data related to a movement of goods between members of a commerce system;
   program code to estimate daily disaggregating parameters (DDP) by minimizing an error function of day of week and transactional data grouped according to promotion, price range, or customer;
   program code to estimate model parameters based on the DDP and transactional data using a demand model to generate a forecast of demand for the goods based on a first time scale;
   program code to disaggregate the forecast of demand into components based on a second time scale using the DDP
   program code to determine the components of the forecast of demand by minimizing the error function given by:

$$\text{error}(k, d, t) = Txn(k, t)\left(w(d) - w_{act}(k, d, t)\left(\sum_{d \in I(k,t)} w(d)\right)\right);$$

and
   program code to provide the components of the forecast of demand for the goods to a member of the commerce system to control the movement of goods in the commerce system.

13. The medium of claim 12, wherein the first time scale is weekly and the second time scale is daily.

14. The medium of claim 12, further including program code to account for variation in the demand model due to promotions, price changes, and out-of-stock of a product when determining the components of the forecast of demand.

15. The medium of claim 12, further including program code to account for variation in the demand model due to low selling products when determining the components of the forecast of demand.

16. The medium of claim 12, wherein disaggregating the forecast for demand into daily components uses less computing resources than daily aggregation.

17. A system for controlling commercial transactions using a forecast of demand, comprising:
   a commerce system having a plurality of members each having a control system for controlling movement of goods between the members;
   a database in electronic communication with the commerce system for recording transactional data related to movement of goods between the members of the commerce system; and
   a computer in electronic communication with the commerce system for estimating daily disaggregating parameters (DDP) by minimizing an error function of day of week and transactional data grouped according to promotion, price range, or customer, estimating model parameters based on the DDP and transactional data using a demand model to generate a forecast of demand for the goods based on a first time scale, and disaggregating the forecast of demand into components based on a second time scale using the DDP;
   wherein the components of the forecast of demand is determined by minimizing the error function given by:

$$\text{error}(k, d, t) = Txn(k, t)\left(w(d) - w_{act}(k, d, t)\left(\sum_{d \in I(k,t)} w(d)\right)\right);$$

and
   wherein the components of the forecast of demand for the goods is provided to a member of the commerce system to control the movement of goods in the commerce system.

18. The system of claim 17, wherein the first time scale is weekly and the second time scale is daily.

19. The system of claim 17, wherein variation in the demand model due to promotions, price changes, and out-of-stock of a product is taken into account when determining the components of the forecast of demand.

20. The system of claim 17, wherein variation in the demand model due to low selling products is taken into account when determining the components of the forecast of demand.

21. The system of claim 17, wherein disaggregating the forecast for demand into daily components uses less computing resources than daily aggregation.

* * * * *